(12) United States Patent
Andreussi et al.

(10) Patent No.: US 7,820,299 B2
(45) Date of Patent: Oct. 26, 2010

(54) METHOD TO PRODUCE AN ELEMENT SUBJECT TO WEAR, AND ELEMENT SUBJECT TO WEAR THUS OBTAINED

(75) Inventors: Alberto Andreussi, Tricesimo (IT); Guido Castenetto, Udine (IT); Valeria Moroso, legal representative, Udine (IT); Nella Castenetto, legal representative, Udine (IT); Silvana Castenetto, legal representative, Udine (IT); Primo Andreussi, Reana del Rojale (UD) (IT); Eddy Pontelli, Tricesimo (UD) (IT)

(73) Assignee: F.A.R.- Fonderie Acciaierie Roiale-SpA, Reana del Rojale (IT)

( * ) Notice: Subject to any disclaimer, the term of this patent is extended or adjusted under 35 U.S.C. 154(b) by 1041 days.

(21) Appl. No.: 10/568,919

(22) PCT Filed: May 6, 2004

(86) PCT No.: PCT/IB2004/001414
§ 371 (c)(1),
(2), (4) Date: Oct. 18, 2006

(87) PCT Pub. No.: WO2005/018854
PCT Pub. Date: Mar. 3, 2005

(65) Prior Publication Data
US 2007/0128462 A1 Jun. 7, 2007

(30) Foreign Application Priority Data
Aug. 20, 2003 (IT) .......................... UD2003A0169

(51) Int. Cl.
*B32B 5/18* (2006.01)
*B32B 3/10* (2006.01)
*B32B 15/00* (2006.01)
*B32B 15/18* (2006.01)

(52) U.S. Cl. .................... 428/469; 428/472; 428/472.2; 501/105

(58) Field of Classification Search .................. None
See application file for complete search history.

(56) References Cited

U.S. PATENT DOCUMENTS 3,181,939 A * 5/1965 Marshall et al. ............... 51/309

(Continued)

FOREIGN PATENT DOCUMENTS

EP 0 042 130 4/1984

(Continued)

*Primary Examiner*—Jennifer C McNeil
*Assistant Examiner*—Jason L Savage
(74) *Attorney, Agent, or Firm*—Hamre, Schumann, Mueller & Larson, P.C.

(57) ABSTRACT

Method to produce an element (10) subject to wear, such as a mechanical member, an abrasion or crushing tool or suchlike, comprising a metal matrix (14) and at least a core (12) of ceramic material. The method comprises a preliminary step wherein the core (12) is prepared by mixing at least a first component with a base of aluminum oxide in the form of a (a-Al2O3) with a second component comprising a eutectic compound with a base of a-Al2O3 and ZrO2, a second step wherein the core (12) is arranged in a mold, so as to define a free volume inside the mold, and a third step wherein a molten metal material is cast into the mold, to occupy the free volume so as to anchor to the core (12) and thus form a single body.

10 Claims, 1 Drawing Sheet

U.S. PATENT DOCUMENTS

| | | | |
|---|---|---|---|
| 3,891,408 A * | 6/1975 | Rowse et al. | 51/295 |
| 3,973,977 A * | 8/1976 | Wilson | 501/120 |
| 3,993,119 A * | 11/1976 | Scott | 164/330 |
| 4,415,510 A * | 11/1983 | Richmond | 264/8 |
| 4,457,767 A * | 7/1984 | Poon et al. | 51/298 |
| 4,595,663 A * | 6/1986 | Krohn et al. | 501/103 |
| 4,711,750 A * | 12/1987 | Scott | 264/144 |
| 6,399,176 B1 | 6/2002 | Francois | |
| 6,601,789 B1 * | 8/2003 | Bajadali et al. | 241/301 |
| 2004/0023599 A1 * | 2/2004 | Tunstall | 451/44 |
| 2005/0284029 A1 * | 12/2005 | Bourlier et al. | 51/307 |

FOREIGN PATENT DOCUMENTS

| | | |
|---|---|---|
| EP | 0 841 990 | 8/1999 |
| EP | 0 960 948 | 8/2000 |

* cited by examiner

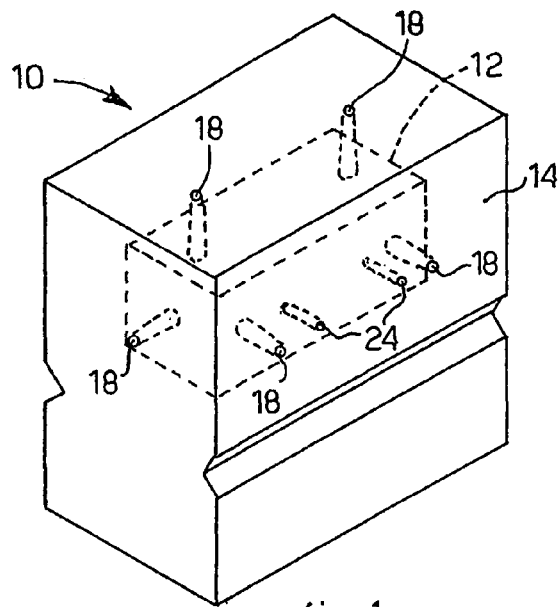
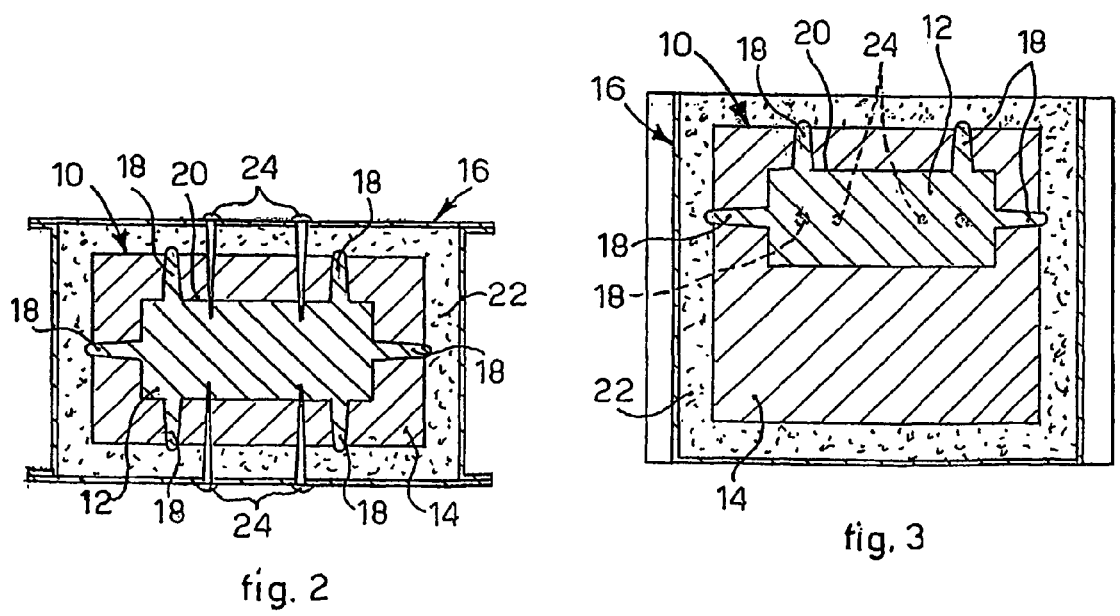
fig. 1
fig. 2
fig. 3

METHOD TO PRODUCE AN ELEMENT SUBJECT TO WEAR, AND ELEMENT SUBJECT TO WEAR THUS OBTAINED

FIELD OF THE INVENTION

The present invention concerns a method to produce an element subject to wear, such as a tool used to crush or abrade mineral substances, masses of construction debris, metal offcuts, or other similar treatments, and an element subject to wear obtained by means of such method.

BACKGROUND OF THE INVENTION

Several methods are known for the production of an element subject to wear, wherein such element substantially comprises a metal matrix, which confers a high level of rigidity and strength to the element, and a core of ceramic material with a high resistance to abrasion.

A first known method, for example described in EP-A-0.930.948, provides to make an element subject to wear with a size of more than 25 mm by means of casting, or centrifuging, a molten metal material on an insert, or biscuit, made of ceramic material, arranged in a mold. The insert consists of a homogeneous solid solution of 20%-80% in weight of $Al_2O_3$ and 80%-20% in weight of $ZrO_2$.

A second known method, for example described in EP-A-0.841.990, provides to cast the molten metal material on a ceramic insert of metal oxide and/or metal carbide, with a perforated or spongy structure, so that, during casting, the molten metal material can penetrate into the apertures and interstices of the insert.

Both these known methods, however, do not allow to obtain elements having mechanical characteristics such as to be employed in any application and field whatsoever, including those with heavy stresses and intense and continuous strain, and which require properties of hardness, toughness and resistance to temperature which cannot be obtained with said methods.

From EP-A-0042130 it is known a method to manufacture ceramic shaped articles by sintering or hot pressing a mixture of dense, non-metallic, mechanically resistant ceramic materials, which contain eutectic constituents consisting of zirconium oxide, hafnium oxide and at least one other high-melting oxide and mixtures thereof. This known method comprises a step wherein a powder is mixed in a hypoeutectic, eutectic, or hypereutectic ratio, is heated to its melting point and, after a rapid cooling, is pulverised and poured into a. Then, the articles are shaped by sintering or pressure-sintering in a pre-heated mould utilizing the resulting powder. Therefore, this known method has the disadvantage to provide for a heating cycle in order to cause the aggregation of the particles of the different ceramic materials which form the mixture.

Purpose of the present invention is to perfect a method versatile enough to obtain elements subject to wear, such as a mechanical member, an abrasion or crushing tool or suchlike, whose characteristics can be pre-determined so as to be able to use them in a wide range of applications. To be more exact the method must allow to obtain elements subject to wear which have a high resistance to wear, optimum toughness and are able to resist considerable stresses, including thermal stresses, and also prolonged strain.

Another purpose is to achieve an element subject to wear wherein the core made of ceramic material does not have to be reinforced internally in order to be positioned stably in the mold, before the molten material is cast, that is, that the core is of the self-supporting type.

Another purpose of the present invention is to achieve a method wherein it is not necessary to pre-heat the mold and the core made of ceramic material before casting the metal material.

Applicant has devised, tested and embodied the present invention to obtain these and other purposes, to achieve other advantages and to overcome the shortcomings of the state of the art.

SUMMARY OF THE INVENTION

The present invention is set forth and characterized in the main claims, while the dependent claims describe other characteristics of the present invention or variants of the main inventive idea.

In accordance with the aforesaid purposes, a method to produce an element subject to wear, comprising a metal matrix and at least a core made of ceramic material, provides a first step wherein the core is arranged in a mold so as to occupy only partly the free volume of the mold, and a second step wherein a molten metal material is cast into the mold, to occupy the free volume, both inside and outside the core, so as to anchor to the latter and thus form a single body.

According to the invention, the core has a geometric conformation coherent with the requirements of the finished element, or of all the sectors of the finished element.

According to the invention, the mold can be obtained in siliceous sand or olivine, to which silicates, resins or bentonites have been suitably added.

According to the invention, the method comprises a preliminary step wherein the core is prepared starting from a ceramic material comprising at least a first component with a base of aluminum oxide in α form ($\alpha$-$Al_2O_3$), which is suitable to be used as an abrasive material resistant to wear. Using this compound in variable percentages, advantageously between 5% and 95% in weight, ensures on each occasion that an element having excellent properties is obtained, in terms of resistance to wear, toughness, stability, resistance to heat, even to high temperatures, and with a relatively limited cost.

The high resistance to heat ensures that the element subject to wear and its cutting profile maintain their shape, guaranteeing duration and efficiency over time.

According to the invention, the core also comprises a second component with a base of a eutectic compound of $\alpha$-$Al_2O_3$ and $ZrO_2$, the percentage of which varies advantageously between 5% and 95% in weight. This second component, comprising $ZrO_2$, is added to the first component to form the core made of ceramic material, giving to the core a coefficient of heat dilation more compatible with that of the metal material cast.

According to a characteristic feature of the invention, the first and second component, although aggregated, remain two distinct components inside the mixture, ensuring that the individual properties of each are maintained. These components can be present in particles in granule form, or in any other form suitable for them to aggregate by means of bonding agents, silicates or other joining means.

The metal material of which the matrix is made is advantageously ferrous, although this characteristic is not essential for the present invention. In the case of ferrous material, it is martensitic steel. According to a variant, it is chromed cast iron, or other similar material.

According to another characteristic of the present invention, before the metal material is cast, both the sand mold and the inner core are kept at ambient temperature and must not be heated, which allows a considerable reduction in the costs of setting up and feeding heating apparatuses.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 1 is a three-dimensional view of an element subject to wear according to the present invention;

FIG. 2 is a horizontal section of the element in FIG. 1, arranged in a sand mold;

FIG. 3 is a vertical section of the element in FIG. 1.

DETAILED DESCRIPTION OF A PREFERENTIAL FORM OF EMBODIMENT OF THE INVENTION

With reference to FIG. 1, a method according to the invention to produce an element 10 subject to wear, such as a mechanical member, an abrasion or crushing tool or suchlike, comprising a core 12 or panel, made of ceramic material, and a metal matrix 14, provides the following steps in all: preparation and forming of the core 12; arrangement of the core 12 in a sand mold 16 (FIGS. 2 and 3); casting of a molten metal material into the mold 16 to form the matrix 14, cooling of the element 10 and removal of the mold 16, quenching of the element 10 and possible finishing operations.

In the first step the core 12 is made by aggregating two distinct components with a ceramic material base, easily found on the market; the first component comprises as its main compound aluminum oxide in a form, or $\alpha\text{-}Al_2O_3$, and a second component comprises a eutectic compound of $\alpha\text{-}Al_2O_3$ and $ZrO_2$.

In this case, the first component has a complex polycrystalline structure and comprises 94.0%-97.0% in weight of $\alpha\text{-}Al_2O_3$, and, as secondary compounds, spinel of magnesium aluminum and hexagonal aluminate of rare earths. According to a variant, 97.0%-100% in weight of the first component consists of $\alpha\text{-}Al_2O_3$.

The aluminum oxide $\alpha\text{-}Al_2O_3$ can be either of natural or synthetic origin.

The eutectic component, on the contrary, comprises 57%-63% in weight of $\alpha\text{-}Al_2O_3$ and 37%-43% of $ZrO_2$.

In this case, both the first and the second component are in the form of easily mixable granules, but it is clear that they can be in any other suitable form so that they can be mixed.

In a first application, the method provides to mix 5% in weight of the first component with 95% in weight of the second component. This application is particularly suitable to obtain a core 12 with the characteristic of great toughness and higher coefficient of heat dilation.

In a second application, the method provides to use 95% in weight of the first component and 5% in weight of the second component. This application is particularly suitable to obtain a core 12 with the characteristic of high resistance to abrasion.

However, the field of the present invention includes all the possible combinations in which the core 12 consists of mixtures of between 5% and 95% in weight of the first component and between 5% and 95% in weight of the second component. The combinations depend on the type of application for which the element 10 is intended.

All the percentages expressed above in the description are intended with respect to the overall weight of the sum of the two components.

The two components are then aggregated by using suitable bonding agents, advantageously from 1% to 3% in weight, in a suitable mold, called the core box and not shown in the drawings, to form the core 12, that is, a homogeneous monolithic body, advantageously porous, or a structure of a grid type with polygonal or circular holes, in order to allow the subsequent penetration of the molten metal which will form the metal matrix 14. According to the invention, the first and the second component of the core 12 remain distinct elements when they are mixed and aggregated.

According to another characteristic of the present invention, the aforesaid core box is shaped so that the core 12 includes spacer elements 18 in a single piece or body, which are arranged uniformly on its outer surface 20.

The core 12 is inserted inside the sand mold 16 for casting, so that the spacers 18 are positioned stably in the corresponding lateral walls 22 of the mold 16. The spacers 18 substantially have a double advantage: they confer on the core 12 a self-supporting characteristic, obviating the need for a supporting reinforcement inserted at the center of the core 12, with the advantage of reducing the production times and costs; they define a correct position of the core 12, determining a free volume around the core 12 inside the mold 16.

The molten metal material is then cast, through a casting channel not shown in the drawings, so as to occupy the whole free volume, both inside and outside the core 12, and thus anchor to the core 12, forming a single body. Advantageously the sand of the mold 16 consists of olivine, that is, silicate of iron and magnesium, which does not develop free silica, and therefore does not cause silicosis and is particularly suitable for casting molten metal material.

The core 12 can also be attached temporarily to the mold by means of attachment elements 24, such as nails, screws or suchlike, which are arranged between the core 12 and the walls 22, in order to anchor the core 12 solidly in the position defined by the spacers 18.

Both the core 12 and the mold 16 are at ambient temperature before casting is carried out.

The molten metal material in this case is a mixture of martensitic steel. Alternatively chromed cast iron is used.

Subsequently, the element 10 is made to cool slowly in the mold to a temperature of less than 300° C., in order to reduce the inner tensions, then it is knocked out and subjected to quenching at about 950-1100° C., preferably at 1000° C., for a determinate period of time, according to the thickness of the element 10, and cooled in forced air. In a preferential embodiment, the element 10 is progressively heated during the quenching step for about 10 hours to about 950-1100° C., following a determinate temperature ramp, and then kept at temperature for about 2-6 hours.

After cooling, the element 10 is worked, in order to perform flattening, leveling or other treatments, so as then to be mounted on a crushing member, such as for example the rotor of a mill. The element 10 shown in the drawings is substantially shaped as a parallelepiped, for example, but it is clear that this shape is not limitative for the present invention, since it depends on the subsequent application of the element 10.

It is clear, however, that modifications and/or additions of steps may be made to the method to produce an element 10 subject to wear as described heretofore, without departing from the field and scope of the present invention.

It is also clear that, although the present invention has been described with reference to specific examples, a person of skill in the art shall certainly be able to achieve many other equivalent forms of method to produce an element 10 subject to wear, all of which shall come within the field and scope of the present invention.

The invention claimed is:

1. An element subject to wear, comprising:
   a metal matrix; and
   a core made of ceramic material,
   said matrix being obtained by casting a molten metal material into a mold in which said core is arranged,
   wherein said core comprises:
      a first component with a base of aluminum oxide in α form ($\alpha$-$Al_2O_3$), and
      a second component with a base of a eutectic compound of $\alpha$-$Al_2O_3$ and $ZrO_2$,
      wherein said first component and said second component are aggregated by means of bonding agents while remaining distinct components in a mixture,
   wherein the molten metal material cast into the mold occupies a whole inside volume of said core and a whole outside volume between said core and the mold, forming a single body that anchors said core.

2. The element according to claim 1, wherein said first component and said second component are in the form of granules aggregated together by means of bonding agents.

3. The element according to claim 1, wherein said core comprises from 95% to 5% in weight of said first component and from 5% to 95% in weight of said second component, said percentages referring to the overall weight of the sum of the two components.

4. The element according to claim 3, wherein said core comprises 5% in weight of said first component and 95% in weight of said second component.

5. The element according to claim 1, wherein said eutectic compound comprises from 7% to 63% in weight of $\alpha$-$Al_2O_3$ and from 37% to 43% in weight of $ZrO_2$.

6. The element according to claim 1, wherein said first component comprises at least from 94% to 100% in weight of $\alpha$-$Al_2O_3$.

7. The element according to claim 6, wherein said first component comprises from 0% to 6% in weight of oxides of rare earths and of magnesium.

8. The element according to claim 1, wherein said molten metal material comprises martensitic steel.

9. The element according to claim 1, wherein said molten metal material comprises chromed cast iron.

10. The element according to claim 1, wherein said core comprises spacer elements in a single piece with said core, emerging from the outer surface of said core and able to cooperate with corresponding walls of said mold.

\* \* \* \* \*